(No Model.)
M. O. NASH.
TART CUTTER.
No. 388,904. Patented Sept. 4, 1888.
Fig. 1.
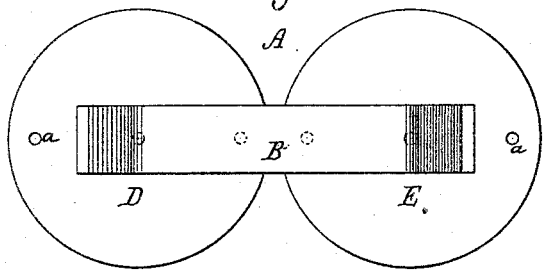
Fig. 2.
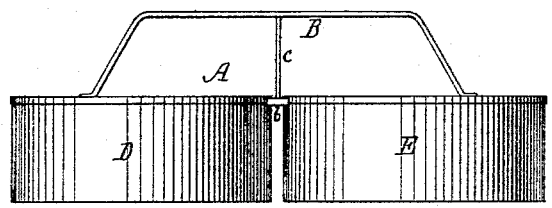
Fig. 3.
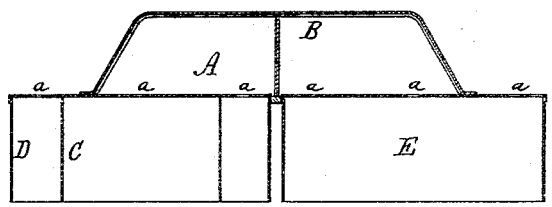
Fig. 5.     Fig. 4.
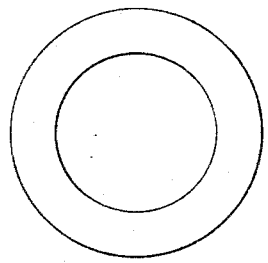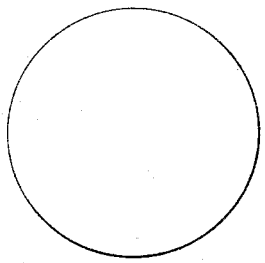
Fig. 6.
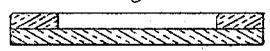
Witnesses
W. E. Piper.
A. F. Piper.
Inventor.
Mary O. Nash,
by Singleton & Piper, attys.
N. PETERS, Photo-Lithographer, Washington, D. C.

UNITED STATES PATENT OFFICE.

MARY O. NASH, OF ABINGTON, MASSACHUSETTS.

TART-CUTTER.

SPECIFICATION forming part of Letters Patent No. 388,904, dated September 4, 1888.

Application filed May 5, 1888. Serial No. 272,926. (No model.)

*To all whom it may concern:*

Be it known that I, MARY O. NASH, a citizen of the United States, residing at Abington, in the county of Plymouth and State of Massachusetts, have invented certain new and useful Improvements in Tart Cutters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 is a top view, Fig. 2 a side elevation, and Fig. 3 a longitudinal section, of a tart-cutter made in accordance with my invention. Fig. 4 is a top view of the disk cut by the cutter E. Fig. 5 is a top view of the annulus cut by the cutters C and D. Fig. 6 is a section of the disk and annulus as applied to each other.

The nature of my invention is defined in the claim hereinafter presented.

In the drawings, A denotes the tart-cutter, which is composed of a handle, B, and three circular cutters, C D E, constructed, arranged, and connected to each other and to the said handle and having in their tops vent holes *a*, as shown. The cutters D and E are of like diameter one with the other and are attached to each other by a connection, *b*, a standard, *c*, extending from said connection up to the handle B. The cutter C is arranged within and concentric with the cutter D and is of a diameter corresponding to that of the chamber in the tart which is to receive the jam or jelly. The cutting-edges of said cutters are arranged in the same plane, as represented.

In using this implement it is to be grasped by the handle and the edges of the cutters pressed into and through a sheet of dough rolled to the proper thickness and arranged on a molding-board, table, or flat surface, and on removing said cutter from the sheet of dough and shaking from it the pieces removed therefrom the disk or part severed from the sheet by the cutter E will form the bottom or body of the tart, and the annulus formed by or between the cutters C and D will form the boundary of the chamber which is to receive the jam, jelly, or preserve, all as shown.

The implement hereinbefore described is very useful for the purpose for which it is intended.

What I claim as my invention is—

The tart-cutter consisting of the cutters C, D, and E, the cutter C being within the cutter D and all three in the same plane and provided with the handle B, as set forth.

In testimony whereof I affix my signature in presence of two witnesses.

MARY O. NASH.

Witnesses:
WM. H. NASH,
CHAS. A. BROWNE.